(12) United States Patent
Jeremiah (10) Patent No.: US 8,311,969 B2
(45) Date of Patent: Nov. 13, 2012

(54) METHOD AND SYSTEM FOR REDUCING FALSE POSITIVES IN THE CLASSIFICATION OF DATA

(75) Inventor: Garreth Jeremiah, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 12/351,570

(22) Filed: Jan. 9, 2009

(65) Prior Publication Data

US 2010/0179936 A1    Jul. 15, 2010

(51) Int. Cl.
*G06F 17/00* (2006.01)
*G06N 5/02* (2006.01)

(52) U.S. Cl. .......................................... 706/50
(58) Field of Classification Search ................. None
See application file for complete search history.

(56) References Cited

U.S. PATENT DOCUMENTS

| | | | |
|---|---|---|---|
| 5,991,714 A | 11/1999 | Shaner | |
| 6,954,756 B2 * | 10/2005 | Arning et al. ................. | 1/1 |
| 2002/0073138 A1 | 6/2002 | Gilbert et al. | |
| 2005/0240615 A1 | 10/2005 | Barsness et al. | |
| 2006/0224549 A1 * | 10/2006 | Otte et al. ..................... | 706/62 |

OTHER PUBLICATIONS

Fumera et al. "Multiple Reject Thresholds for Improving Classification Reliability", F.J. Ferri et al. (Eds.): SSPR&SPR 2000, LNCS 1876, pp. 863-871.*
Quinn at al. "A Survey of Techniques for Preprocessing in High Dimensional Data Clustering", Cybernetic & Informatics Eurodays : Young Generation Viewpoint, pages: 9.*
Miskon et al. "A Repetitive Observation Strategy for Recognizing a True Anomaly and Estimating its Position", in Proceedings of ACRA, 2008, pages: 9.*

* cited by examiner

*Primary Examiner* — Alan Chen
*Assistant Examiner* — Li-Wu Chang
(74) *Attorney, Agent, or Firm* — George R. McGuire; Bond Schoeneck & King (57) ABSTRACT

A method and system for reducing false positives in the classification of data is provided, wherein the data can be categorized into fields, including creating an assertion table or assessing an existing assertion table for the data whereby the data is placed into categories and each category is assigned one or more classifications, setting a positive and/or negative assertion ratio for each category, determining the accuracy of each classification by assessing a percentage of the data in each category to see if the data is correctly identified by the classification, if the positive assertion ratio is reached, maintaining the classification for each category of data, if the negative assertion ratio is reached, de-asserting the classification.

17 Claims, 9 Drawing Sheets

METHOD AND SYSTEM FOR REDUCING FALSE POSITIVES IN THE CLASSIFICATION OF DATA

TECHNICAL FIELD

The present invention relates generally to methods and systems for reviewing data, and particularly to methods and systems for reducing errors in the classifying of data.

BACKGROUND

Data leakage prevention systems classify data, commonly, based on the content. Identifying individual pieces of data, such as social security numbers and credit card numbers has a high occurrence of false positives. Format validation for social security numbers can lead to accepting any nine digit number as a social security number, which could actually be a product number, a document reference or something other than a social security number.

Validation for many formats is available, by using an algorithm such as the Luhn formula for credit cards. The Luhn algorithm or Luhn formula, also known as the "modulus 10" or "mod 10" algorithm, is a simple checksum formula used to validate a variety of identification numbers, such as credit card numbers. It was created by IBM scientist Hans Peter Luhn and described in U.S. Pat. No. 2,950,048.

The problem with certain validation methods alone is that data may still pass the validation but still be incorrect, such as a 16 digit number may still pass a Luhn check and not be a credit card, providing inaccurate validation or a false positive (also known as a "type-II error"). Moreover, when individual assertions are used to contribute to the overall assertion of a file, larger files will have a greater probability of false positive. A common approach to reduce the effect of false positives causing an erroneously classified file is to use a threshold value, only considering the overall file to contain a certain data type when more than a threshold number of assertions have been made that contains the certain data type. Raising the threshold too high causes a false negative problem where valid classifications are missed because the threshold was not met. Moreover, with large files, as the problem of incorrect classification re-occurs, there is a greater probability of false positives. Setting threshold values merely obscure the problem, instead of solving it.

Even with the assignment of threshold values to data based on the size of the file may help reduce false positives, there remains a need to provide a method and system in the classification of data that reduce the inaccuracies that occur during the categorizing and identifying of data into classes or fields of data.

SUMMARY

According to one embodiment of the present invention, a method of reducing false positives in the classification of data is provided, wherein the data can be categorized into columns or fields, the method including creating an assertion table or assessing an existing assertion table for the data whereby the data is placed into categories and each category is assigned one or more classifications, setting a positive and/or negative assertion ratio for each category, determining the accuracy of each classification by assessing a portion of the data in each category to see if the data is correctly identified by the classification, if the positive assertion ratio is reached (and cannot be undone), maintaining the classification for each category of data, if the negative assertion ratio is reached (and cannot be undone), de-asserting the classification.

In a further aspect of the method, the positive assertion ratio includes the percentage of data that must match the classification to maintain the classification and the negative assertion ratio comprises the percentage of data that does not match the classification.

In yet another aspect of the method, a positive assertion includes data that is identified accurately by the classification and a negative assertion includes data that is not identified accurately by the classification.

In still a further aspect of the method, data that is neither identified as positive or negative is not counted as a positive assertion or a negative assertion.

In another aspect of the method, data that is neither identified as positive or negative is counted as either a positive assertion, a negative assertion, or ignored.

In still a further aspect of the method, the percentage of the data that is assessed is less than one hundred percent.

In another aspect of the method, the percentage of the data that is assessed is one hundred percent.

In yet another aspect of the method, the data is already identified with a classification prior to creating the assertion table.

In still a further aspect of the method, the data is not identified with a classification prior to creating the assertion table.

In yet another aspect of the method, setting the positive and negative assertion ratios is dependent upon the type of category.

In one more aspect of the method, the categories may include data that is personal to an entity. The categories may include, but are not limited to, social security numbers, drivers licenses, names, birthdates, telephone numbers, email addresses, insurance numbers, business account numbers, account information, credit card numbers, bank account numbers, health identifiers, addresses, dates, currency values, health related records (diagnostic codes, treatment codes, ailments), regulatory identified data and national identification numbers.

In another embodiment of the invention, a system for reducing false positives in the classification of data includes at least one database having one or more files of data, wherein the data can be categorized into fields, a user interface linked to the database, and a validation manager for creating an assertion table or assessing an existing assertion table for the data whereby the data is placed into categories and each category is assigned one or more classifications, setting a positive and/or negative assertion ratio for each category, determining the accuracy of each classification by assessing a percentage of the data in each category to see if the data is correctly identified by the classification, if the positive assertion ratio is reached, maintaining the classification for each category of data, if the negative assertion ratio is reached, de-asserting the classification.

In a further aspect of the system, the positive assertion ratio includes the percentage of data that must match the classification to maintain the classification and the negative assertion ratio includes the percentage of data that does not match the classification.

In yet another aspect of the system, the percentage of the data that is assessed is less than one hundred percent.

In still a further aspect of the system, the percentage of the data that is assessed is one hundred percent.

In yet another embodiment of the invention, a computer program product encoded in a computer readable medium for instructing a system to reduce false positives in the classification of data, is provided wherein the data can be categorized into fields, the program code configured to cause the computer to perform the method including creating an assertion table or assessing an existing assertion table for the data whereby the data is placed into categories and each category is assigned one or more classifications, setting a positive and/or negative assertion ratio for each category, determining the accuracy of each classification by assessing a percentage of the data in each category to see if the data is correctly identified by the classification, if the positive assertion ratio is reached, maintaining the classification for each category of data, if the negative assertion ratio is reached, de-asserting the classification.

In a further aspect of the computer program product, the positive assertion ratio includes the percentage of data that must match the classification to maintain the classification and the negative assertion ratio comprises the percentage of data that does not match the classification. The positive ratio and the negative ratio equal one hundred.

In another aspect of the computer program product, the percentage of the data that is assessed is less than one hundred percent.

In yet one more aspect of the computer program product, the percentage of the data that is assessed is one hundred percent.

BRIEF DESCRIPTION OF THE DRAWINGS

The present invention will be more fully understood and appreciated by reading the following Detailed Description in conjunction with the accompanying drawings, in which.

DETAILED DESCRIPTION

Embodiments of the invention provide a system and method for reducing false positives in the classification of data in a data file.

Data files may include data in the form of lists, tables, records, logs, untabulated, or uncharted form. Embodiments of the system and method herein are able to analyze "columnizable" data (i.e., data that can be put into a table under specific categories) that is provided in any form, and supply data classifications to accurately identify the categories of data. Moreover, the embodiments herein can be used to assess already-identified data classifications to determine the accuracy of a data classification for a category of data. The reduction of false positives in the accuracy of assertions on whole and partial files of data is hereby realized.

Data in a file that can be "columnized" (e.g., csv, excel, xml, etc.) can be assessed by providing a running score of positive and negative assertions for each column, not for the file as a whole. That is, each record in a file is classified into columns, wherein each column may have a heading identifying the data in the column. Each heading can be considered a classification, although the column of data with the classification may contain information inconsistent with the classification.

In accordance with embodiments herein, each column of data is verified to determine the consistency of the classification with the information contained therein. Reference is made to Table 1 below, which shows a file of data already provided in columnized form having four fields and nine records of data. The field can be an identifier for the column such as an index or a name. In this case, the field is a number, i.e., (1), (2), (3), (4).

TABLE 1

| (1) Record Number | (2) NAME | (3) LICENSE | (4) EMAIL |
| --- | --- | --- | --- |
| 1 | Garreth Jeremiah | 159381234 | gj@example.com |
| 2 | John Jones | 159989999 | jj@example.com |
| 3 | Peter Smith | 159000001 | ps@example.com |
| 4 | Marianne Priestly | 159010000 | mp@example.com |
| 5 | Lynne Forgall | 159125467 | lf@example.com |
| 6 | Friday January | 159080435 | fj@example.com |
| 7 | Ruby Tuesday | | rt@example.com |
| 8 | Roxanne Glaxo-Smith-Klein | 123052243 | rr@example.com |
| 9 | Sharona Migh | 159380000 | sm@example.com |

Although Table 1 includes headings for each column, this is optional. Each column is assessed by the information therein, and not necessarily by the heading or title given to the column. Column headings can be used to infer the assumed classification for that column (in which case they may be used to pre-populate an assertion table), although each column will be assessed for multiple classifications and not just by the heading identifying the column.

Table 1 contains nine records of data, provided in tabular form. Prior art processes typically identify data in a file if there is only one positive match, or more than a defined threshold, i.e., typically only match counts are recorded and no negative matches are considered. For example, using prior art methods to identify the information in Table 1, one could assert that the data under the "NAME" heading could be identified as a "name" of a person since the data does appear to be names of persons, or as "company" since the data does show a company name under record 8. Accordingly (assuming the prior art were capable of such identifications), the whole file/data would be CORRECTLY classified as (containing) "name" by prior art methods based on Column 2.

Additionally, it would be FALSELY classified as (containing) "company," if a threshold was not used, since column 2 also appears to contain one company (record 8), resulting in a positive match, which can be all that's required to assert a classification against the whole file in prior art. If a threshold had been set for the identifier "company," for example, at greater than 1 for this file, then Column 2 of Table 1 would be CORRECTLY classified as *NOT* a "company."

Using prior art processes to continue to evaluate the data in Table 1, the next column with the heading "LICENSE" is reviewed. The column contains what appears to be social security numbers in records 1, 5, 6 and 8. A prior art process would assert that the file contains social security numbers, even though they are just numbers that look like social security numbers. The prior art process would then validate the numbers as social security numbers because, typically, only match counts are recorded. If a threshold were used to provide a requirement for positive matches and the threshold was set at 4 or less for this file, it would still be considered to contain social security numbers, since four of the nine records appear to contain social security numbers. Using prior art methods, the whole file/data would be considered to contain (i.e. to be classified as) "ssn" (Social Security Numbers) based on Column 3 since there are four records that appear as social security numbers, even though the remaining records do not appear to be social security numbers.

The last column in Table 1 contains the heading "EMAIL." Since the data in column 4 of Table 1 appears to contain email addresses, by prior art methods, the data would have been CORRECTLY classified as (containing) "email" caused by Column 4.

In summary, two ("company" and "ssn") of the four classifications of data in Table 1, would provide inaccurate identification of data in Table 1, producing false positives using prior art verification methods.

The data in Table 1 will now be analyzed using embodiments of the method and system of the invention. To analyze the data in each column of Table 1 for accuracy of classification, each record is reviewed.

In order to analyze the data using novel methods herein, an assertion processing table is used. It should also be mentioned that a "policy" table is defined at the start of the process to contain the preferred ratios for various data classifications. Typically, a base policy will require 51% positive matches. For each data or classification, a positive assertion threshold or rate (PAR) and a negative assertion threshold or rate (NAR) are set. For Table 1 above, the following policy table, Table 2, is used to assist in the interpretation of the data.

As shown in Table 2, the PAR is 60 for name, ssn, and email and 70 for company. Null means that no data is available or it is unclear what the data shows. The policy table determines how to interpret null, e.g., whether to use it as a positive match or a negative match. "Ignore_Null" can be "no" or "yes." If set to "yes," any null values are not considered to be positive or negative. "Null_is_Positive," has no effect if "Ignore_Null" is positive (true/yes). Alternatively, if "Ignore_Null" was "no," "Null_is_Positive" is used to determine if a null value should be considered a positive match or a negative match, e.g., all Null values for "name" would be positive matches because "True" is set forth in the column under "Null_is_Positive." For "company," "ssn," and "email" classifications, if "Ignore_Null" was "no," any Null values would be negative matches.

Once the policy table is set, the assertion processing table is created in order to produce information for an assertion table. The following Table 3 shows an assertion processing table (after having processed a total of nine records.) Its values maintain the tally of information processing.

TABLE 3

| Field | Classification | Process | Current_PAR | Current_NAR | Current_Null | Processed Times |
|---|---|---|---|---|---|---|
| 2 | name | false | 6 | 0 | 0 | 6 |
| 2 | company | false | 0 | 7 | 0 | 7 |
| 3 | ssn | false | 4 | 4 | 1 | 9 |
| 4 | email | false | 6 | 0 | 0 | 6 |

The Field heading identifies the column from Table 1. The Classification heading describes the type of information in the Field. Field (2) in Table 1 includes data that may be classified under name or company. Field (3) in Table 1 includes data that may be classified under ssn and Field 4 in Table 1 includes data that may be classified under email. It should be mentioned that there may be duplicated classifications for other fields, but each field/classification combination is unique.

The Process column provides information as to whether the classification should be processed or skipped. When "true" is listed, it is processed and when "false" is listed it is skipped. The next column, Current PAR, denotes the number of positive assertions at a point in time for the field/classification. Current NAR denotes the number of negative assertions at a point in time for the field/classification. Current Null is the number of Null values at a point in time for the field/classification. The last column in Table 3, Processed Times, denotes the number of times the field/classification combination has been process.

In viewing Table 3, Field 2 and Classification Name has a "false" listing under the Process column. Six records have been processed with a total of six positive matches. Since there are a total of nine records and six positive values have been recorded, the Target_PAR of 60 has been met (6÷9=0.66×100=66). Accordingly, the processing has been completed for this field/classification since the Target_PAR

TABLE 2

| classification | Target_PAR | Target_NAR | Positive_if_Equal | Ignore_Null | Null_is_Positive | Upperlimit |
|---|---|---|---|---|---|---|
| name | 60 | 40 | true | no | True | — |
| company | 70 | 30 | true | no | False | — |
| ssn | 60 | 40 | true | yes | False | — |
| email | 60 | 40 | true | no | False | — | has been met. Therefore, the Process column has inserted therein a "false" value to denote that this field/classification can now be skipped. Table 3 below depicts an assertion table that has been completed. This shows the final results for the processing of the data. As shown in Table 3, name shows six positive matches.

Referring back to Table 2 above, Field 2/Company Classification shows a Current_NAR of seven after seven processing seven records. The Target_NAR in the policy table, which is 30 for this field/classification has been surpassed (7 processed records÷9 total records=0.77×100=77). Accordingly, there is no need to process further records and a "false" is input into the Process column.

Field 3/Classification SSN lists a Target_PAR of 60 and a Target_NAR of 40. After processing nine records, the Current_PAR is 4, the Current_NAR is 4 and the Current_Null is 1.

Field 4/Classification Email lists a Target_PAR of 60 and a Target_NAR of 40. After processing six records, the Current_PAR matches six records. The Process is false,(no more processing needs to be conducted) since this field/classification has reached the Target_PAR (6÷9=0.66×100=66).

As recognized from the foregoing description of Table 3, the Target_PAR or Target_NAR much be reached before the processing of records is complete. After either Target_PAR or Target_NAR is reached, the processing can stop. If neither TARGET is reached, processing continues until a target is reached or until all records are processed, whichever occurs first. The policy table may set forth the number of records to be processed before processing can be completed, or it may state that the number may be set after so many records have been processed.

The assertion table below, Table 4, provides the outcome from the assertion processing table, Table 3 above.

TABLE 4

Assertion Table.

| Field | Classification | Processed Times |
|---|---|---|
| (2) | name | 6 |
| (4) | email | 6 |

For the embodiments described herein, each record or a percentage of the records are reviewed to determine the actual type of data set forth in the file, and whether the record matches the classification. If a classification is not given for a column of data, a classification is then provided based on the review of the data. The validation of classifications is based on positive and negative assertion ratios or thresholds. For each classification and column of data, a positive assertion ratio and a negative assertion ratio is calculated. An assertion ratio or threshold is a percentage beyond which that column's positive or negative assertion is made.

For example, if the "name" classification and data it identifies has a positive assertion threshold or rate (PAR) of for example, 60%, which means it has a negative assertion threshold or rate (NAR) of 40% (by default), the amount of records that are actually a name must be at least 60%, to receive a positive assertion. If there are records where this field fails to classify as "name" this alters the NAR, if there are sufficient failures the Current_NAR breaches the 40% threshold (and cannot fall back below the threshold) then the classification will be de-asserted (if any prior assertions exist they are "removed").

Using the "ssn" classification discussed above, if a PAR is assigned as, for example, 60%, which means it has a NAR of 40%, the amount of records that are actually a social security number must be at least 60%, or the classification will need to be de-asserted. In the prior art example above, using the embodiments described herein, an assertion threshold is calculated and the impact of the 4 pieces of data that falsely verify as social security numbers is removed.

In another embodiment herein, a method and system are provided whereby an entire file of data does not have to be evaluated in order to classify it. If the positive assertion ratio is 60%, the negative assertion ratio is 40%. As soon as the positive assertion ratio is met, AND that percentage of the file has been evaluated, there is no need to continue with further evaluation of the data in the file. The following scenarios further describe this embodiment.

Best Case 1: Every assertion is negative: When 40% of the file is read, the Negative Assertion Rate potential has breached the Negative Assertion Ratio and the file MUST be negative. In this case, the classification must be de-asserted. Thus, in the case of falsely matching data, the best case scenario would only require NAR % of a file to be read.

Best Case 2: Every assertion is positive. When 60% of the file is read, the Positive Assertion Rate potential can no longer fall below the Positive Assertion Ratio. Accordingly, the file must be positive and the classification is verified.

Worst Case: File has 60% positive and 40% negative assertions. The whole file must be read (or a pre-defined upper limit) in this case to determine where to correctly place the records, i.e., under what classification.

Figure 1:
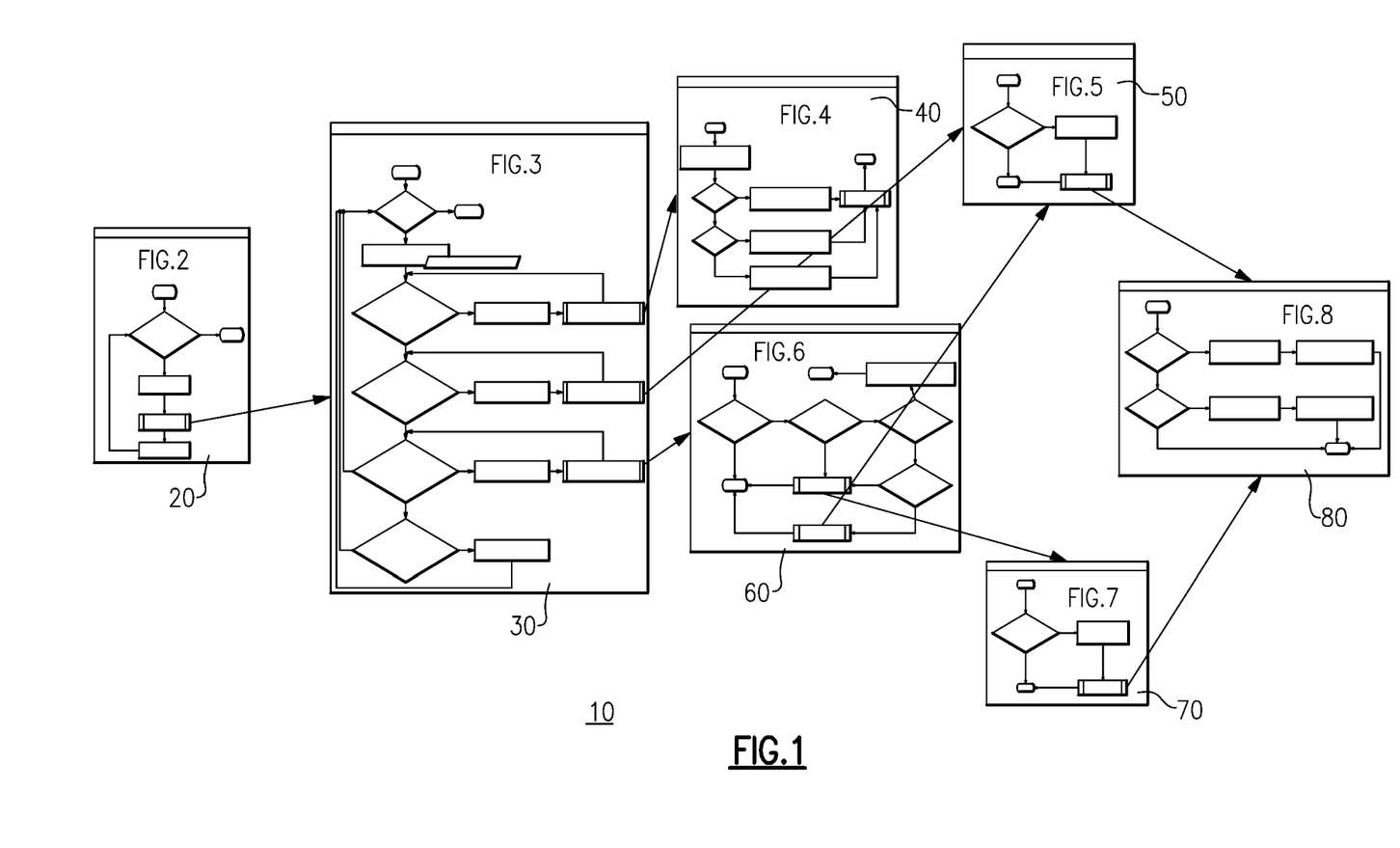
FIG. 1 shows a schematic diagram of an embodiment of a method of the invention.

It should be mentioned that the method may be implemented in circumstances where data has or has not been set forth in an assertion table. Reference is made to FIG. 1, which displays an embodiment of the logic 10 of the system.

Figure 2:
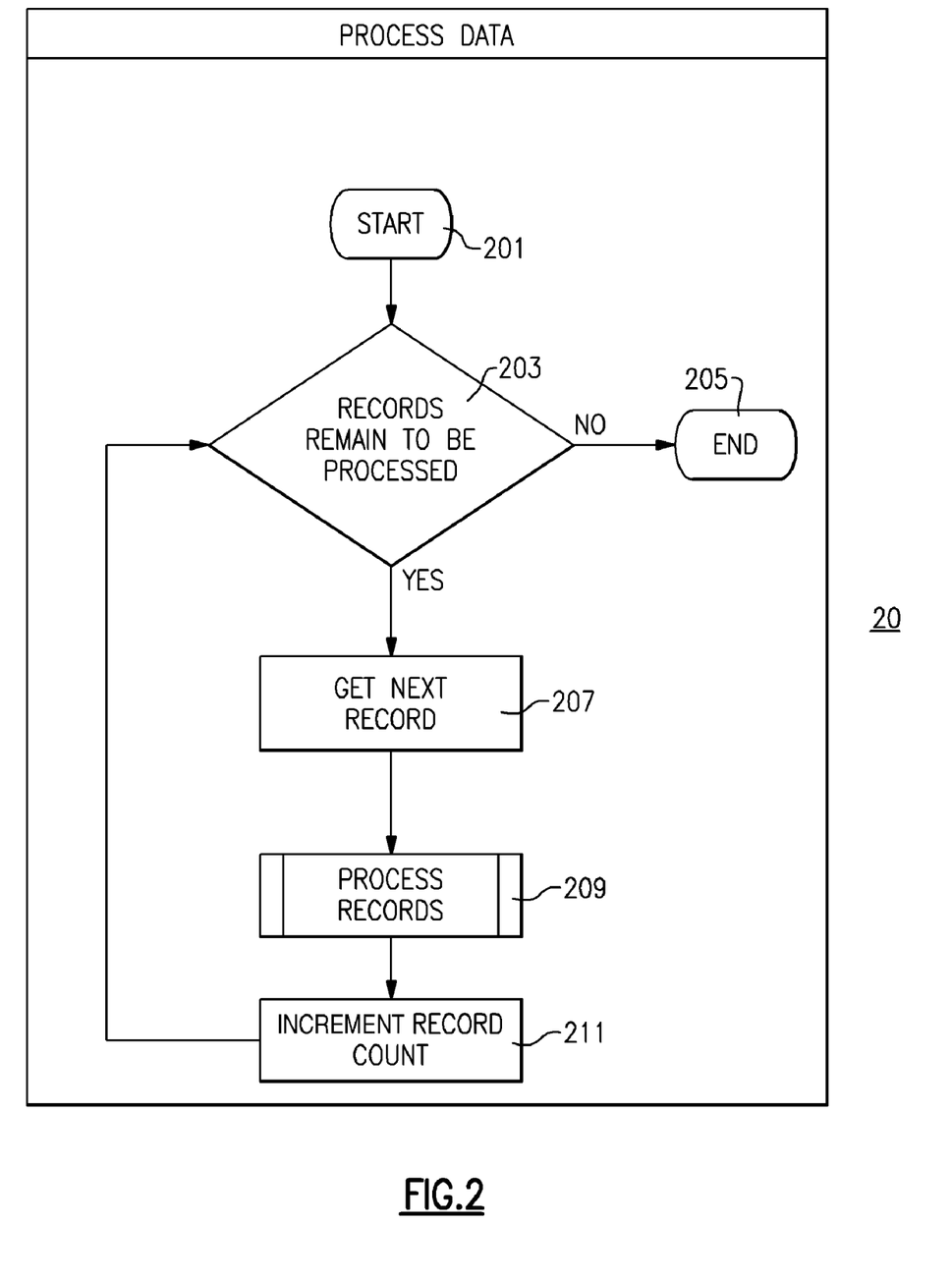
FIG. 2 shows a schematic diagram of an embodiment of a method of the invention.

Logic 10 may be described by a series of diagrams or flow charts, 20, 30, 40, 50, 60, 70 and 80. Diagram 20 displays the logic for processing data. At step 201, the process begins. At step 203, the system queries whether records remain to be processed. If no, the process ends at step 205. If the answer is yes, the next record is retrieved at step 207. At step 209, the record is processed as discussed above. At step 211, the record count is increased to include the record that was processed in step 209. The process continues to step 203 and begins the process again until all records have been processed.

Figure 3:
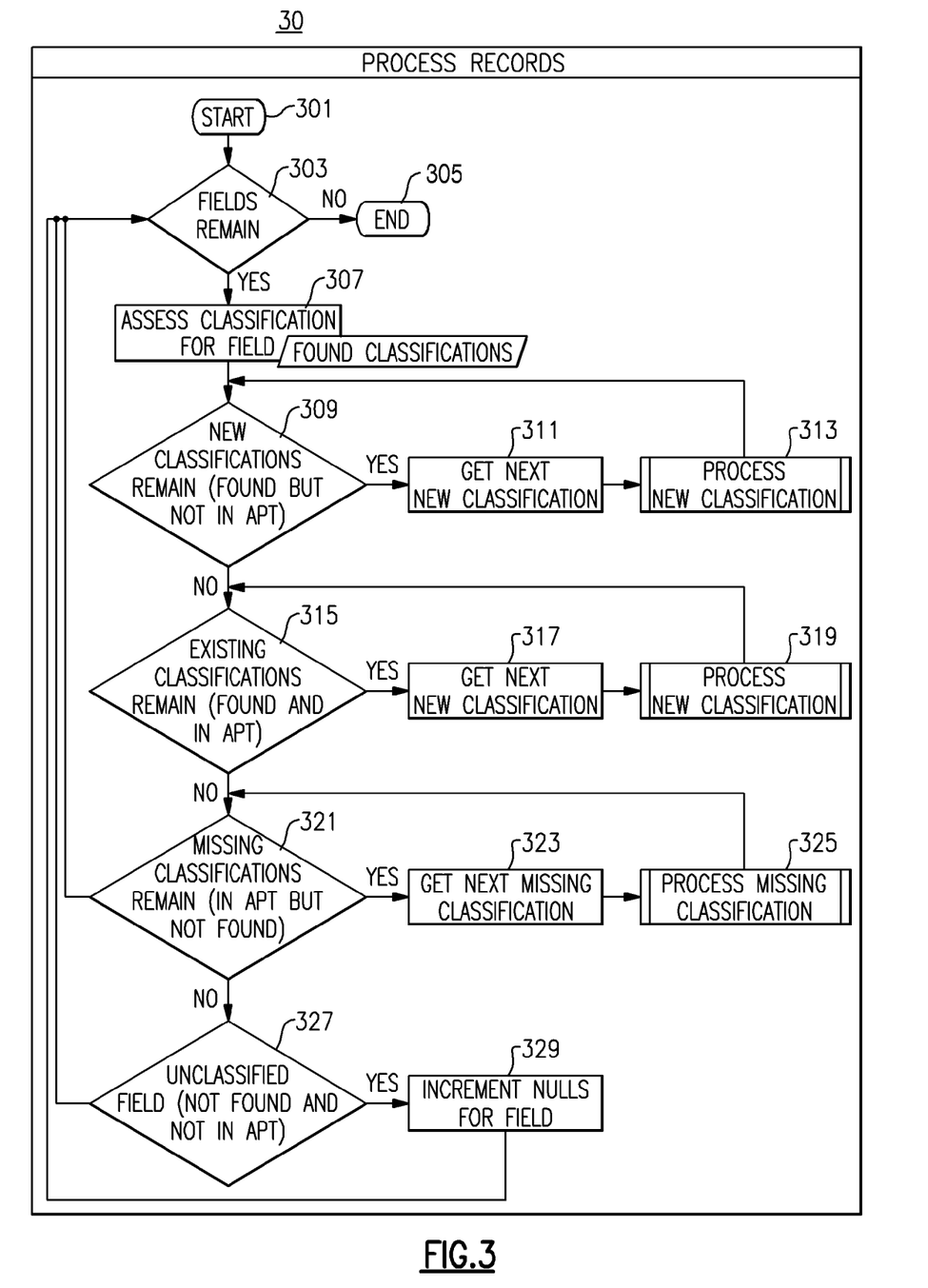
FIG. 3 shows a schematic diagram of an embodiment of a method of the invention.

The logic for processing records, step 209 of diagram 20, is represented in diagram 30 of FIG. 3. The process begins at step 301. At step 303, the system queries whether fields remain to be processed. If no, the process ends at step 305. If the answer to the query is yes, at step 307, the classification for the field is assessed.

In the next step, step 309, the system queries whether new classifications remain (i.e., they are found but are not in the assertion processing table). If the answer is yes, the next new classification is retrieved at step 311. At step 313, the classification is processed. The process continues to loop around to step 309 until the answer to the query is no. If the answer is no the system queries at step 315 whether existing classifications remain (i.e., they are found and are in the assertion processing table). If the answer to this query is yes, the next existing classification is retrieved at step 317. At step 319, the PAR is processed. This loop continues until the answer to the query at step 315 is no.

If the answer to the query at step 315 is no, the system queries whether missing classifications remain at step 321 (i.e., they are in the assertion processing table, but they are not found). If the answer to this query is no, the next missing classification is retrieved at step 323. At step 325, the missing classification is processed. This loop continues until the answer to the query at step 321 is no.

If the answer to the query at step 321 is no, the system queries whether there is any unclassified field at step 327 (i.e., they are not in the assertion processing table, and they are not found). If the answer is yes, the record is valued as a null record at step 329 and the process begins again at step 303. If the answer to the query at step 327 is no, the process begins again at step 303.

Figure 4:
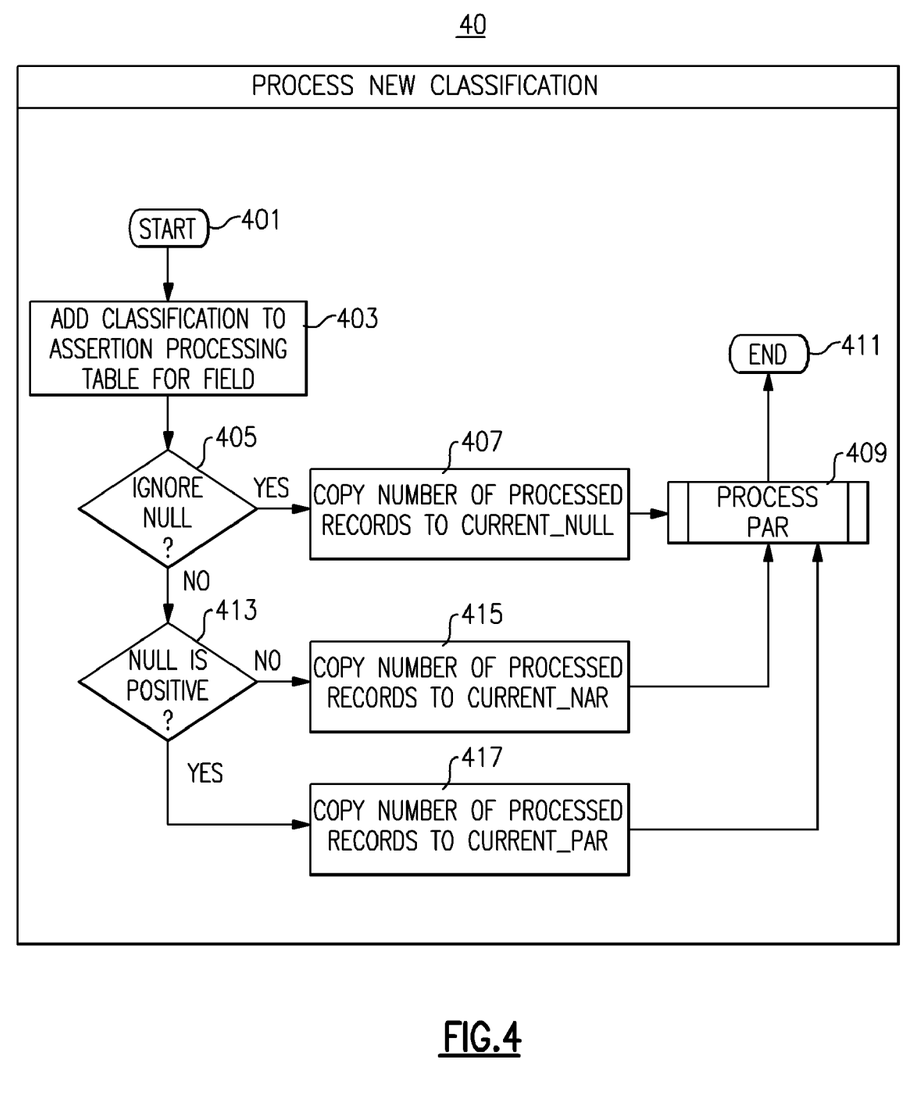
FIG. 4 shows a schematic diagram of an embodiment of a method of the invention.

The logic for processing new classifications, step 313 of diagram 30, is represented in diagram 40 of FIG. 4. The process begins at step 401. At step 403, the new classification is added to the assertion processing table for the field. At step 405, the system queries whether to ignore Null. If the answer is Yes, the number of processed records is copied to Current_Null at step 407. At step 409, PAR is processed and at step 411, the process ends.

If the answer to the query at step 405 is no, the system queries whether null is positive at step 413. If the answer is no, the number of process records is copied to Current_NAR at step 415 and the process continues to step 409. If the answer to the query at step 413 is yes, the number of processed records is copied to Current_PAR at step 417 and the process continues to step 409.

Figure 5:
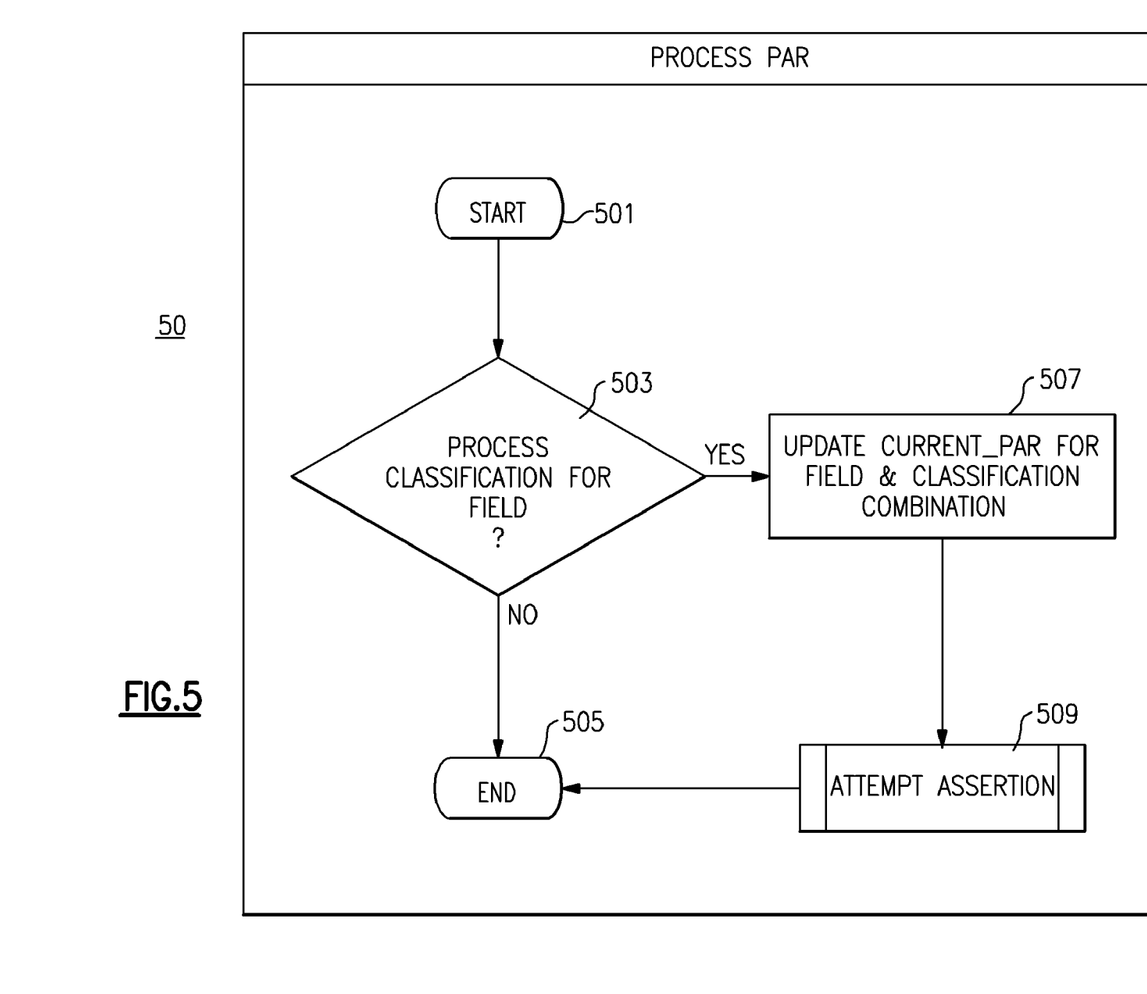
FIG. 5 shows a schematic diagram of an embodiment of a method of the invention.

The logic for processing PAR, step 319 of diagram 30 and step 409 of diagram 40, is represented in diagram 50 of FIG. 5. The process begins at step 501. At step 503, the system whether to process the classification for the field at step 503. If the answer is no, the process ends at step 505. If the answer is yes, the Current_PAR for the field and classification combination is updated at step 507. At step 509, the assertion is attempted and the process ends at step 505.

Figure 6:
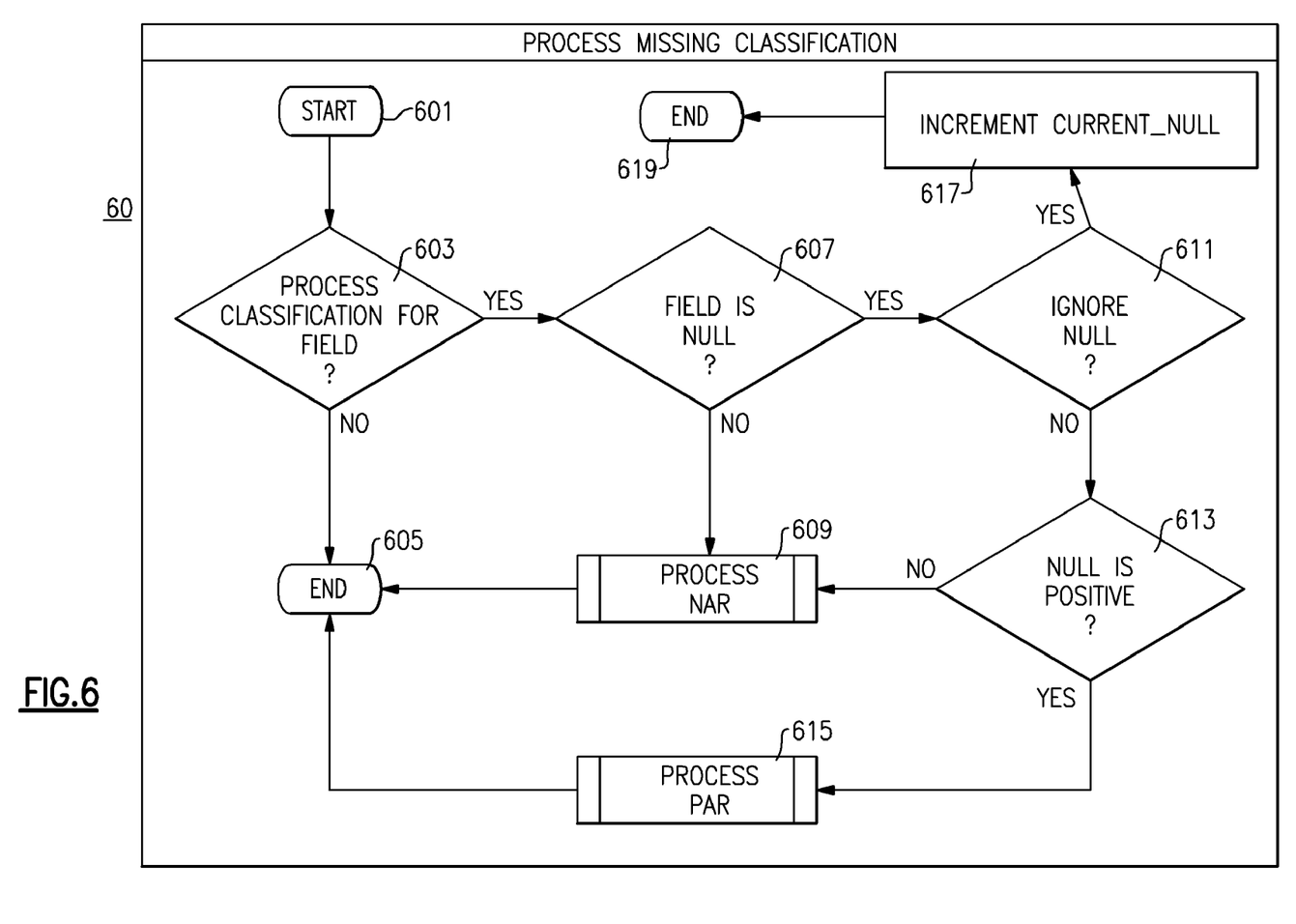
FIG. 6 shows a schematic diagram of an embodiment of a method of the invention.

The logic for processing missing classifications, step 325 diagram 30, is represented in diagram 60 of FIG. 6. The process begins at step 601. At step 603, the system queries whether to process the classification for the field. If the answer is no, the process ends at step 605. If the answer is yes, the system queries whether the field is null at step 607. IF the answer is no, the record is process as NAR at step 609 and the process ends at step 605. If the answer is yes, the system queries whether to ignore null at step 611. If the answer is no the system queries whether null is positive at step 613. If null is positive, the record is processed as PAR at step 615 and the process ends at step 605. If null is not positive the record is processed as NAR at step 609 and ends at step 605. If the answer to the query at 611 is yes, the record is added to the table as Null at step 617 and the process ends at step 619.

Figure 7:
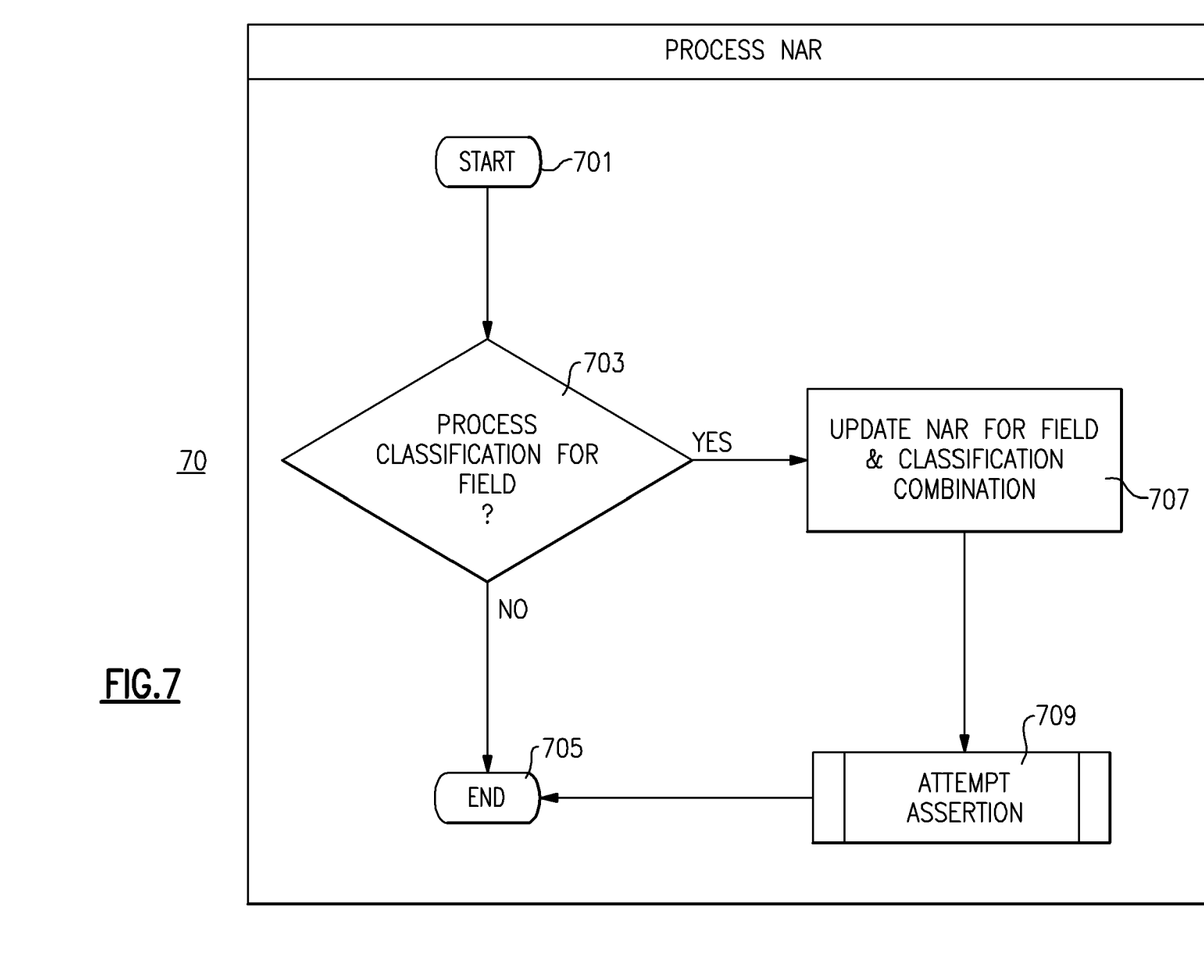
FIG. 7 shows a schematic diagram of an embodiment of a method of the invention.

The logic for processing NAR, step 609 of diagram 60, is represented in diagram 70 of FIG. 7. The process begins at step 701. At step 703, the system queries whether to process the classification for the field. If the answer is no, the process ends at step 705. If the answer is yes, NAR is updated for the field and classification combination at step 707. At step 709, the assertion is attempted and the process ends at step 705.

Figure 8:
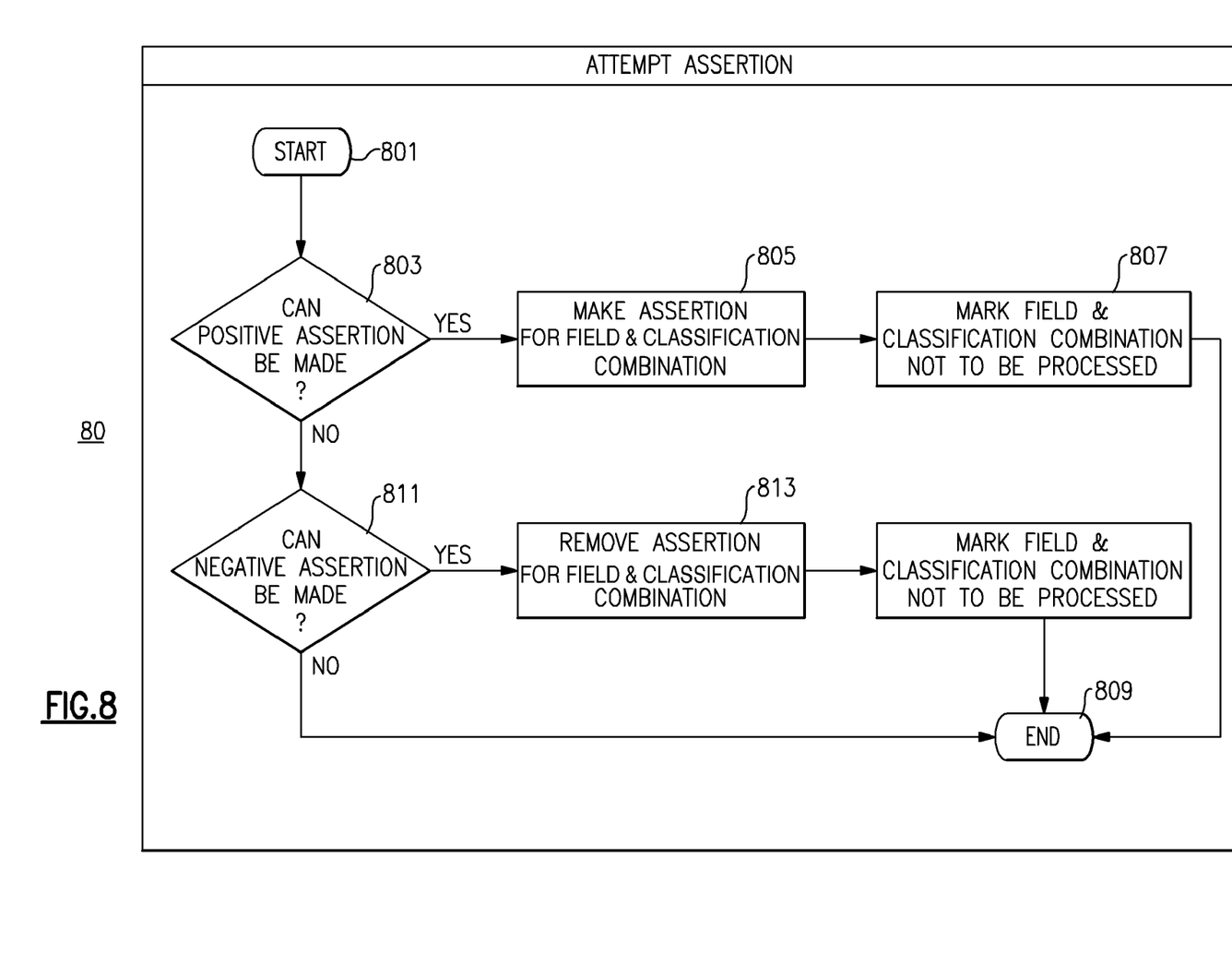
FIG. 8 shows a schematic diagram of an embodiment of a method of the invention.

The logic for attempting an assertion, step 509 of diagram 50 and step 709 of diagram 70, is represented in diagram 80 of FIG. 8. The process begins at step 801. At step 803, the system queries whether there a positive assertion can be made. If the answer is yes, an assertion is made for the field and classification combination at step 805. At step 807, the field and classification combination is marked with NOT to be processed and the process ends at step 809.

If the answer to the query at step 803 is no, the system queries whether a negative assertion can be made at step 811. If the answer is no, the process ends at step 809, If the answer is yes, the assertion is removed for the field and classification combination at step 813. At step 815, the field and classification combination is marked with NOT to be processed and the process ends at step 809.

The following non-limiting examples illustrate embodiments of the invention.

EXAMPLES

In this example, Record 1 (R1) and Field 1 (F1) from Table 1 will be processed. Record 1 of Field 1 is number 1. The assertion processing table before processing any records is empty as shown below.

Initial
Processed Records: 0

| APT (Assertion Processing Table): | | | | | | |
|---|---|---|---|---|---|---|
| Field | Classification | Process | Current_PAR | Current_NAR | Current_Null | Processed Times |
| — | — | — | — | — | — | — |

The process proceeds as follows for R1 F1:

| Processing Record 1 Field 1 | |
|---|---|
| Assess Classification: | No Classifications |
| New Classifications Remain? | No |
| Existing Classifications Remain? | No |
| Missing Classifications Remain? | No |
| Unclassified Field? | Yes |
| Increment Nulls for Field | |

After R1 F1
Processed Records: 0

| APT (Assertion Processing Table): | | | | | | |
|---|---|---|---|---|---|---|
| Field | Classification | Process | Current_PAR | Current_NAR | Current_Null | Processed Times |
| 1 | — | TRUE | 0 | 0 | 1 | 1 |

In the processing of this Record, the field is the record number, which is not classified, therefore it has no new classifications, no existing classifications and no missing classifications. It is processed under Null.

This next record to be processed is Record 1, Field 2 as follows.

| Processing R1 F2 | |
|---|---|
| Assess Classification: | Name |
| New Classifications Remain? | Yes |
| Get Next New: | Name |
| Process New | |
| Add classification to APT for field | |
| Ignore Null (lookup in Policy Table) | No |

| Processing R1 F2 | |
|---|---|
| Null is Positive (lookup in Policy Table) | Yes |
| Copy number of Processed Records (0) to Current_PAR | |
| Process PAR | |
| Process Classification for Field? | Yes |
| Update PAR for field | |
| Attempt Assertion | |
| Can Positive Assertion be made? | No |
| Can Negative Assertion be made? | No |
| Existing Classifications Remain? | No |
| Missing Classifications Remain? | No |
| Unclassified Field? | No |

The assertion processing table is now filled in as follows:
After R1 F2
Processed Records: 0

APT (Assertion Processing Table):

| Field | Classification | Process | Current_PAR | Current_NAR | Current_Null | Processed Times |
|---|---|---|---|---|---|---|
| 1 | — | TRUE | 0 | 0 | 1 | 1 |
| 2 | Name | TRUE | 1 | 0 | 0 | 1 |

Processing continues across other records/fields until Record 3 Field 3.
Before R3 F3
Processed Records: 2
The assertion processing table is filled in up to the processing of R3 F3 as follows:

APT (Assertion Processing Table):

| Field | Classification | Process | Current_PAR | Current_NAR | Current_Null | Processed Times |
|---|---|---|---|---|---|---|
| 1 | — | TRUE | 0 | 0 | 1 | 1 |
| 2 | Name | TRUE | 3 | 0 | 0 | 3 |
| 3 | SSN | TRUE | 2 | 0 | 0 | 2 |
| 4 | Email | TRUE | 2 | 0 | 0 | 2 |

Record 3 Field 3 is processed as follows:

| | |
|---|---|
| Assess Classification: | None (fails SSN validation |
| New Classifications Remain? | No |
| Existing Classifications Remain? | No |
| Missing Classifications Remain? | Yes |
| Get Next Missing Classification: | SSN |
| Process Missing Classification | |
| Process Classification for Field: | true |
| Field is Null: | No (we have 159000001) |
| Process NAR | |
| Process Classification for Field: | true |
| Update NAR for Field and Classification | |
| Attempt Assertion | |
| Can Positive Assertion be made ? | No |
| Can Negative Assertion be made ? | No |
| Missing Classifications Remain? | No |
| Unclassified Field? | No |

After R3 F3
Processed Records: 2
The assertion processing table is filled in after the processing of R3 F3 as follows:

| | | APT (Assertion Processing Table): | | | | |
|---|---|---|---|---|---|---|
| Field | Classification | Process | Current_PAR | Current_NAR | Current_Null | Processed Times |
| 1 | — | TRUE | 0 | 0 | 1 | 3 |
| 2 | Name | TRUE | 3 | 0 | 0 | 3 |
| 3 | SSN | TRUE | 2 | 1 | 0 | 3 |
| 4 | Email | TRUE | 2 | 0 | 0 | 2 |

Processing continues until Record 6, Field 2.
Before R6 F2
Processed Records: 5
The assertion processing table is filled in up to the processing of R6 F2 as follows:

| | | APT (Assertion Processing Table): | | | | |
|---|---|---|---|---|---|---|
| Field | Classification | Process | Current_PAR | Current_NAR | Current_Null | Processed Times |
| 1 | — | TRUE | 0 | 0 | 1 | 6 |
| 2 | Name | TRUE | 5 | 0 | 0 | 5 |
| 3 | SSN | TRUE | 3 | 2 | 0 | 5 |
| 4 | Email | TRUE | 5 | 0 | 0 | 5 |

Record 6 Field 2 is processed as follows:

| | |
|---|---|
| Assess Classification: | Name |
| New Classifications Remain? | No |
| Existing Classifications Remain? | Yes (Name) |
| Get Next Existing: | Name (Friday January_) |
| Process PAR | |
| Process Classification for Field: | Yes |
| Update Current_PAR for the filed and classification | |
| Attempt Assertion | |
| Can Positive Assertion be made ? | Yes |
| Make Assertion | No |
| Mark field/classification to not be processed | |
| Existing Classifications Remain? | No |
| Missing Classifications Remain? | No |
| Unclassified Field? | No |

The assertion processing table is filled in after the processing of R6 F2 as follows:
After R6 F2
Processed Records: 5

| | | APT (Assertion Processing Table): | | | | |
|---|---|---|---|---|---|---|
| Field | Classification | Process | Current_PAR | Current_NAR | Current_Null | Processed Times |
| 1 | — | TRUE | 0 | 0 | 1 | 6 |
| 2 | Name | FALSE | 6 | 0 | 0 | 6 |
| 3 | SSN | TRUE | 3 | 2 | 0 | 5 |
| 4 | Email | TRUE | 5 | 0 | 0 | 5 |

An assertion table may now be filled in for the classification Name since it has met the threshold set forth in the policy table (Table 2) above for this classification has been met.

| | Assertion Table | |
|---|---|---|
| Field | Classification | Processed Times |
| 2 | Name | 6 |

Processing continues using explained descriptions above until Record 8, Field 2 needs to be processed.

The assertion processing table is filled in after the processing of R8 F2 as follows:

After R8 F1
Processed Records: 7

| | | APT (Assertion Processing Table): | | | | |
|---|---|---|---|---|---|---|
| Field | Classification | Process | Current_PAR | Current_NAR | Current_Null | Processed Times |
| 1 | — | TRUE | 0 | 0 | 8 | 8 |
| 2 | Name | FALSE | 6 | 0 | 0 | 6 |
| 3 | SSN | TRUE | 4 | 3 | 3 | 7 |
| 4 | Email | FALSE | 6 | 0 | 0 | 6 |

The assertion table is updated as follows:

| Assertion Table | | |
|---|---|---|
| Field | Classification | Processed Times |
| 2 | Name | 6 |
| 4 | Email | 6 |

Record 8 Field 2 is processed as follows:

| | |
|---|---|
| Assess Classification: | Name, Company |
| New Classifications Remain? | Yes (Company) |
| Get Next New Classification: | Company |
| Process New | |
| Add classification to APT for field | |
| Ignore Null (look up in Policy Table) | No |
| Null is Positive (look up in Policy Table) | No |
| Copy number of Processed Records (7) to Current_NAR (Not PAR) | |
| Process PAR | No |
| Process Classification for Field? | Yes |
| Update PAR for field | (was 0, now 1. C_PAR is 1 C_NAR is 7) |
| Attempt Assertion | |
| Can Positive Assertion be made? | No |
| Can Negative Assertion be made? | Yes |
| Remove Assertion | (none made) |
| Mark field/classification to not process | |
| New Classifications Remain? | No |
| Existing Classifications Remain? | Yes (Name) |
| Get Next New Classification: | NAME |
| Process PAR | |
| Process Classification for Field? | No |
| Existing Classifications Remain? | No |
| Missing Classifications Remain? | No |
| Unclassified Field? | No |

The assertion processing table is filled in after the processing of R8 F2 as follows:

| | | APT (Assertion Processing Table): | | | | |
|---|---|---|---|---|---|---|
| Field | Classification | Process | Current_PAR | Current_NAR | Current_Null | Processed Times |
| 1 | — | TRUE | 0 | 0 | 8 | 8 |
| 2 | Name | FALSE | 6 | 0 | 0 | 6 |
| 2 | Company | FALSE | 1 | 7 | 0 | 8 |
| 3 | SSN | TRUE | 4 | 3 | 0 | 7 |
| 4 | Email | FALSE | 6 | 0 | 0 | 6 |

There is no field filled into the assertion table for Company since this single instance can not cause the column to be considered "company" as there can not be enough positive matches to reach the target PAR defined in the policy. The assertion table remains the same as follows for Field 2.

| Assertion Table | | |
|---|---|---|
| Field | Classification | Processed Times |
| 2 | Name | 6 |

Figure 9:
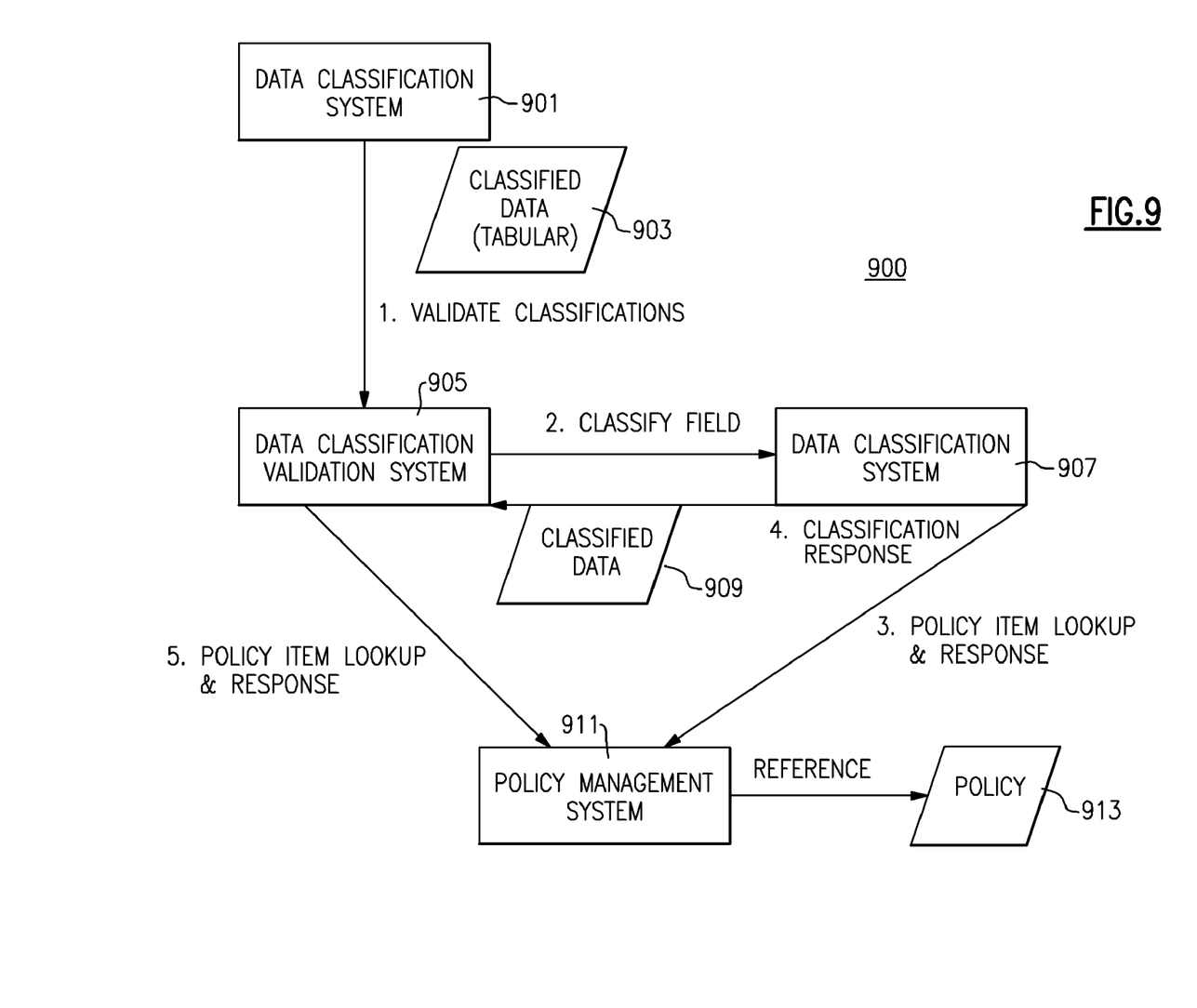
FIG. 9 shows a schematic diagram of an embodiment of a system of the invention.

Reference is made to FIG. 9, which illustrates an embodiment of a system 900, for reducing false positives in the classification of data. System 900 includes a data classification system 901, which contains the data to be classified 903.

Classification system 901 is linked to a data classification validation system 905, which validates the classification. The classification may be handled by a second data classification system 907, which classifies the data 909 and which is linked to and sends it to the data classification validation system 905. A policy management system 911 defines the policy 913 and is linked to data classification system 907 and data classification validation system 905.

In yet another embodiment, the method embodiments herein may be implemented within or between one or more computer systems, by executing computer-readable program code stored on computer-readable media. The computer-readable media may include, for example, any number or mixture of fixed or removable media (such as one or more fixed disks, random access memories (RAMs), read-only memories (ROMs), or compact discs), at either a single location or distributed over a network. The computer-readable program code may include, for example, instructions embodied in software or firmware.

The computer-readable program code may include various components, such as program code, code to display a user interface, and code to instruct a system to reduce false positives in the classification of data, wherein the data can be categorized into fields, code to create an assertion table for the data, code to assess an existing assertion table containing the data, code to place the data into categories, code to assign each category one or more classifications, code to set a positive and/or negative assertion ratio for each category, code to determine the accuracy of each classification, code to assess a percentage of the data in each category to see if the data is correctly identified by the classification, code to maintain a classification for each category of data if the positive assertion ratio is reached, and code to de-assert a classification for each category if the negative assertion ratio is reached.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A method of reducing false positives in the classification of data, wherein the data can be categorized into columns, comprising:
   creating an assertion table or assessing an existing assertion table for the data whereby the data is placed into categories and each category is assigned one or more classifications;
   setting a positive and negative assertion ratio for each category, wherein the positive assertion ratio comprises the percentage of data that must match the classification to maintain the classification, and the negative assertion ratio comprises the percentage of data that does not match the classification;
   determining the accuracy of each classification by assessing a percentage of the data in each category to see if the data is correctly identified by the classification;
   if the positive assertion ratio is reached, maintaining the classification for each category of data; and
   if the negative assertion ratio is reached, de-asserting the classification.

2. The method of claim 1 wherein a positive assertion comprises data that is identified accurately by the classification and a negative assertion comprises data that is not identified accurately by the classification.

3. The method of claim 2 wherein data that is neither identified as positive or negative is not counted as a positive assertion or a negative assertion.

4. The method of claim 2 wherein the data that is neither identified as positive or negative is counted as either a positive assertion or a negative assertion.

5. The method of claim 1 wherein the percentage of the data that is assessed is less than one hundred percent.

6. The method of claim 1 wherein the percentage of the data that is assessed is one hundred percent.

7. The method of claim 1 wherein the data is already identified with a classification prior to creating the assertion table.

8. The method of claim 1 wherein the data is not identified with a classification prior to creating the assertion table.

9. The method of claim 1 wherein setting the positive and negative assertion ratios is dependent upon the type of category.

10. The method of claim 1 wherein the categories comprise data that is personal to an entity.

11. The method of claim 1 wherein the categories comprise social security numbers, drivers licenses, names, birthdates, telephone numbers, email addresses, insurance numbers, business account numbers, account information, credit card numbers, bank account numbers, health identifiers, addresses, dates, currency values, health related records, regulatory identified data and national identification numbers.

12. A system for reducing false positives in the classification of data comprising:
   at least one database having one or more files of data, wherein the data can be categorized into fields;
   a user interface linked to the database; and
   a validation manager for creating an assertion table or assessing an existing assertion table for the data whereby the data is placed into categories and each category is assigned one or more classifications;
   setting a positive and negative assertion ratio for each category, wherein the positive assertion ratio comprises the percentage of data that must match the classification to maintain the classification and the negative assertion ratio comprises the percentage of data that does not match the classification;
   determining the accuracy of each classification by assessing a percentage of the data in each category to see if the data is correctly identified by the classification;
   if the positive assertion ratio is reached, maintaining the classification for each category of data; and
   if the negative assertion ratio is reached, de-asserting the classification.

13. The system of claim 12 wherein the percentage of the data that is assessed is less than one hundred percent.

14. The system of claim 12 wherein the percentage of the data that is assessed is one hundred percent.

15. A computer program product encoded in a non-transitory computer readable medium for instructing a system to reducing false positives in the classification of data, wherein the data can be categorized into fields, the program code configured to cause the computer to perform the method comprising:
   creating an assertion table or assessing an existing assertion table for the data whereby the data is placed into categories and each category is assigned one or more classifications;
   setting a positive and negative assertion ratio for each category, wherein the positive assertion ratio comprises the percentage of data that must match the classification to maintain the classification and the negative assertion ratio comprises the percentage of data that does not match the classification;

determining the accuracy of each classification by assessing a percentage of the data in each category to see if the data is correctly identified by the classification;

if the positive assertion ratio is reached, maintaining the classification for each category of data; and if the negative assertion ratio is reached, de-asserting the classification.

16. The computer program product of claim 15 wherein the percentage of the data that is assessed is less than one hundred percent.

17. The computer program product of claim 15 wherein the percentage of the data that is assessed is one hundred percent.

* * * * *